(12) United States Patent
Takada et al.

(10) Patent No.: US 6,361,462 B1
(45) Date of Patent: Mar. 26, 2002

(54) V-RIBBED POWER TRANSMISSION BELT

(75) Inventors: Toshimichi Takada; Kazutoshi Ishida; Yorifumi Hineno; Isao Yoshida, all of Kobe (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 09/490,480

(22) Filed: Jan. 24, 2000

Related U.S. Application Data

(63) Continuation-in-part of application No. 09/179,296, filed on Oct. 27, 1998, now Pat. No. 6,177,202.

(30) Foreign Application Priority Data

Oct. 31, 1997 (JP) .............................................. 9-315817
Jan. 25, 1999 (JP) ............................................ 11-015092

(51) Int. Cl.[7] ................................................ F16G 5/06
(52) U.S. Cl. ...................................... 474/251; 474/237
(58) Field of Search ................................ 474/271, 250, 474/260, 263, 237, 251, 268, 264, 515

(56) References Cited

U.S. PATENT DOCUMENTS

| 4,773,895 A | * | 9/1988 | Takami et al. .............. 474/238 |
| 5,415,594 A | * | 5/1995 | Kitahama .................... 474/263 |
| 5,610,217 A | * | 3/1997 | Yarnell et al. ........... 474/271 X |
| 5,624,338 A | * | 4/1997 | Kawashima et al. ........ 474/263 |
| 5,704,862 A | * | 1/1998 | Janne et al. ............ 474/238 X |
| 6,132,328 A | * | 10/2000 | Kinoshita et al. ........... 474/260 |
| 6,177,202 B1 | * | 1/2001 | Takehara et al. ............. 474/515 |

FOREIGN PATENT DOCUMENTS

WO    WO96/13544    5/1996

* cited by examiner

Primary Examiner—David A. Bucci
Assistant Examiner—Colby Hansen
(74) Attorney, Agent, or Firm—Wood, Phillips, VanSanten, Clark & Mortimer

(57) ABSTRACT

A power transmission belt having a body with a length, an inside, an outside, and laterally spaced sides. The body has a bonding rubber layer in which elongate load carrying cords are embedded to extend lengthwise of the body. The body has a first layer on the inside of the bonding rubber layer in which a plurality of laterally spaced ribs are formed extending lengthwise of the body, and a second layer on the outside of the bonding rubber layer in which a plurality of laterally spaced ribs are formed extending lengthwise of the body. The bonding rubber layer has a sulfur-crosslinked rubber composition including an ethylene-α-olefin elastomer. At least one of the first and second layers has a crosslinking product that is an organic peroxide-crosslinked rubber composition including an ethylene-α-olefin elastomer.

23 Claims, 1 Drawing Sheet

V-RIBBED POWER TRANSMISSION BELT

CROSS REFERENCE

This application is a continuation-in-part of co-pending Ser. No. 09/179,296 filed Oct. 27, 1998 now U.S. Pat. No. 6,177,202, entitled "Power Transmission Belt".

BACKGROUND OF THE INVENTION

1. Field of the Invention

This invention relates to power transmission belts and, more particularly, to a power transmission belt having a plurality of laterally spaced ribs extending in a lengthwise direction.

2. Background Art

It is known to use V-belts in automobiles to drive various accessories from the engine crank shaft. Several belts may be independently driven by the crank shaft. In one exemplary engine construction, one belt drives an alternator and a blower, a separate belt drives a power steering unit, and a third belt drives cooling equipment.

There has been a trend to reduce the weight and size of cars to reduce fuel requirements. In many of these cars, a V-ribbed belt is used having a body with longitudinally extending, load carrying cords and a plurality of V-shaped ribs spaced laterally from each other and extending longitudinally on one of the inside and outside of the belt body. The other of the inside and outside of the belt body has one or two plies of rubber-impregnated canvas cloth thereon. The belt can be arranged in a serpentine configuration to cooperate with several accessory pulleys. The belt may be tensioned by an idler pulley which is pressed against the non-ribbed surface. This non-ribbed surface is also used to drive one or more accessories.

Generally, the non-ribbed surface does not have the power transmission capability of the ribbed surface. Frictional wearing of the non-ribbed or ribbed surface may result in a lowering of the belt tension, which could result in slippage. When this occurs, the belt may be incapable of positive power transmission under a heavy load.

To overcome this problem, it is known to use double V-ribbed belts wherein a plurality of laterally spaced and longitudinally extending ribs are provided on both the inside and outside of the belt body. Typically, the ribbed portions on the inside and outside of the belt have identical rib pitch, rib height, and rib shape. Load carrying cords are embedded in the belt body between the inner and outer ribs.

A double V-ribbed belt is commonly used in compact automobile engine compartments. These engines may generate sufficient heat in these smaller compartments that the belts are required to operate in a high temperature environment. It is known to use natural rubber, styrene-butadiene rubber, and chloroprene rubber for belts in this environment. However, these belts using these rubbers are prone to premature cracking. Typically, the cracking occurs in the compression layer of the belt with the rubber therein in a hardened state.

Research has been done to improve the heat resistance of chloroprene rubber. Some improvement has resulted from these efforts. However, the improvement has been limited and in many environments the performance of the improved chloroprene rubber is still inadequate.

Studies have also been undertaken to use, as an alternative, rubber such as chlorosulfonated polyethylene rubber, hydrogenated nitrile rubber, or fluoro rubber. With a main skeleton therein that is highly saturated or completely saturated, these rubbers have excellent heat resistance. Among these rubbers, it is known that chlorosulfonated polyethylene is comparable to chloroprene rubber in terms of dynamic fatigue properties, wear resistance, and oil resistance. However, chlorosulfonated polyethylene has diminished water resistance characteristics resulting from the effects of the vulcanization process, particularly with an acid receiving agent. Typically, oxides such as MgO and PbO have been used as the acid receiving agent for chlorosulfonated polyethylene.

However, when an acid receiving agent having a lead compound, such as PbO and $Pb_3O_4$ is used, while water resistance is improved, there arises a problem with respect to pollution and sanitation attributable to the lead.

When MgO is used as an acid receiving agent, the water resistance is significantly deteriorated by $MgCl_2$ during the crosslinking reaction. The resulting rubber may not be suitable for use in a power transmission belt.

On the other hand, while it is possible to obtain a composition with good water resistance using an epoxy-type acid receiving agent other than the metal oxide, the resulting product has a bad odor, making it unpleasant to those handling the composition.

While power transmission belts, made as described above, may have significantly improved belt running life and excellent heat resistance under high temperature conditions compared with belts using chloroprene rubber, these belts may have an unacceptably low life in a low temperature environment, such as at −30° C. or lower. This may be attributable to the fact that chlorosulfonated polyethylene rubber is formed by chlorosulfonated polyethylene and contains chlorine. The cohesive energy of chlorine is increased at a low temperature to cause hardening of the rubber. At low temperatures, the rubber may lack elasticity and be prone to cracking.

Ethylene-α-olefin elastomers, such as ethylene-propylene rubber (EPR) and ethylene-propylene diene rubber (EPDM) are polymers having excellent heat resistance and cold resistance. These elastomers are also relatively inexpensive. However, these elastomers have a low resistance to oil and as such are not commonly used in applications where they will encounter oil. Since dry frictional V-ribbed belts are prone to slipping when exposed to a significant amount of oil, their transmission capability is deteriorated, making them generally impractical for this environment. However, use of these elastomers in a power transmission environment has been studied, as disclosed in Japanese Patent Laid-Open Hei 345948/1994.

Ethylene-propylene rubber has a relatively low tear strength, which is reduced even further by using a peroxide crosslinking system. As a result, the load carrying cords tend to pop out during operation. It is also difficult to effectively increase the degree of vulcanization in the rubber using a sulfur crosslinking system, so that abrasion may be significant during operation. Abrasion dust tends to accumulate at the base of the ribs, and may cause adhesive wear. This also potentially leads to a significant noise generation problem. While using EPDM with a large number of double bonds in the molecules may increase the degree of vulcanization and adhesive wear properties, it tends to lower heat resistance.

SUMMARY OF THE INVENTION

In one form, the invention is directed to a power transmission belt having a body with a length, an inside, an outside, and laterally spaced sides. The body has a bonding rubber layer in which elongate load carrying cords are embedded to extend lengthwise of the body. The body has a first layer on the inside of the bonding rubber layer in which a plurality of laterally spaced ribs are formed extending lengthwise of the body, and a second layer on the outside of the bonding rubber layer in which a plurality of laterally spaced ribs are formed extending lengthwise of the body. The bonding rubber layer has a sulfur-crosslinked rubber composition including an ethylene-α-olefin elastomer. At least one of the first and second layers has a crosslinking product that is an organic peroxide-crosslinked rubber composition including an ethylene-α-olefin elastomer.

In one form, the first and second layers both have a crosslinking product including an organic peroxide-crosslinked rubber composition with an ethylene-α-olefin elastomer.

In one form, there is no reinforcing cloth on any of the inside, outside, or laterally spaced sides of the body.

The ethylene-α-olefin elastomer in the first and second layers may be at least one of ethylene-propylene-diene monomer (EPDM) and ethylene-propylene rubber (EPR).

The diene monomer may be at least one of dicyclopentadiene, methylene norbornene, ethylidene norbornene, 1,4-hexadiene, and cyclooctadiene.

The organic peroxide may be at least one of dicumyl peroxide, di-t-butyl peroxide, t-butylcumyl peroxide, benzoyl peroxide, 1,3-bis-(t-butyl-peroxyisopropyl) benzene, 2,5-dimethyl-2,5-di(t-butylperoxy)hexyne-3, 2,5-dimethyl-2,5-(benzoylperoxy)hexane, and 2,5-dimethyl-2,5-mono(t-butyl peroxy)hexane.

The organic peroxide may be used either alone or as a mixture within a range of 0.005 to 0.02 mol g per 100 g of ethylene-α-olefin elastomer.

The belt may further include a crosslinking co-agent that is at least one of TIAC, TAC, 1,2-polybutadiene, metal salts of unsaturated carboxylic acids, oxims, guanizine, trimethylol propane trimethacrylate, ethylene glycol dimethacrylate, N,N'-m-phenylene bismaleimide, and sulfur.

The belt may further include one of a) a reinforcing agent that is at least one of carbon black and silica, b) a filler that is at least one of calcium carbonate and talc, c) a plasticizer, d) a stabilizer, e) a processing aid, and f) a colorant.

The belt may further include short reinforcing fibers in at least one of the first and second layers.

A plurality of the short reinforcing fibers may protrude at the laterally spaced sides of the body.

The short reinforcing fibers may be at least one of nylon 6, nylon 66, polyester, cotton, aramid fibers, aramid fibers having aromatic nuclei in the molecular structure, and aramid fibers sold commercially under any of the trademarks CONEX™, NOMEX™, KEVLAR™, TECHNORA™; and TWARON™.

In one form, the short reinforcing fibers have a length of 1–20 mm.

The short reinforcing fibers may be present in an amount of 1 to 30 parts by weight per 100 parts by weight of ethylene-α-olefin elastomer.

In one form, at least one of the first and second layers is fiber-reinforced rubber in which an ethylene-α-olefin elastomer is graft-bonded with short fibers having a diameter of no more than 1.0 μm and present in an amount of 1 to 50 parts by weight per 100 parts by weight of ethylene-α-olefin elastomer.

In one form, the short fibers have a diameter of from 0.05 to 0.08 μm and are present in an amount of 5 to 25 parts by weight per 100 parts by weight of ethylene-α-olefin elastomer.

In one form, a boundary between the short fibers and ethylene-α-olefin elastomer is grafted using an adhesive that is at least one of a) a silane coupling agent that is at least one of vinyl tris (β-methoxyethoxy) silane, vinyltriethoxy silane, and γ-methacryloxypropyl trimethoxy silane, b) a titanate coupling agent that is at least one of isopropyl triisostearoyl titanate and unsaturated carboxylic acid that is at least one of acrylic acid, methacrylic acid, and maleic acid, and c) a novolac type phenol resin.

The ethylene-α-olefin elastomer in the bonding layer may be EPDM with an iodine value from 4 to 40.

The bonding rubber layer may further have at least one of a) a reinforcing agent that is at least one of carbon black and silica, b) a filler that is at least one of calcium carbonate and talc, c) a plasticizer, d) a stabilizer, e) a processing aid, and f) a colorant.

The bonding rubber layer may further have a plurality of short fibers embedded therein.

The sulfur in the bonding rubber layer may be present in an amount of 0.5 to 3.0 parts by weight per 100 parts by weight of ethylene-α-olefin elastomer.

The load carrying cords may have fibers that are treated by applying a resorcinol-formalin latex (RFL) solution thereto.

The fibers of the load carrying cords may be pretreated with at least one of an epoxy and isocyanate compound before treating with RFL.

It is an object of the present invention to provide a power transmission belt having an adequate running life in both high and low temperature environments, even with the various rubber layers in the belt repetitively deformed in compression and tension.

It is also an object of the invention to provide a belt with good resistance to water and other environmental contaminants.

DETAILED DESCRIPTION OF THE DRAWINGS

Figure 1:
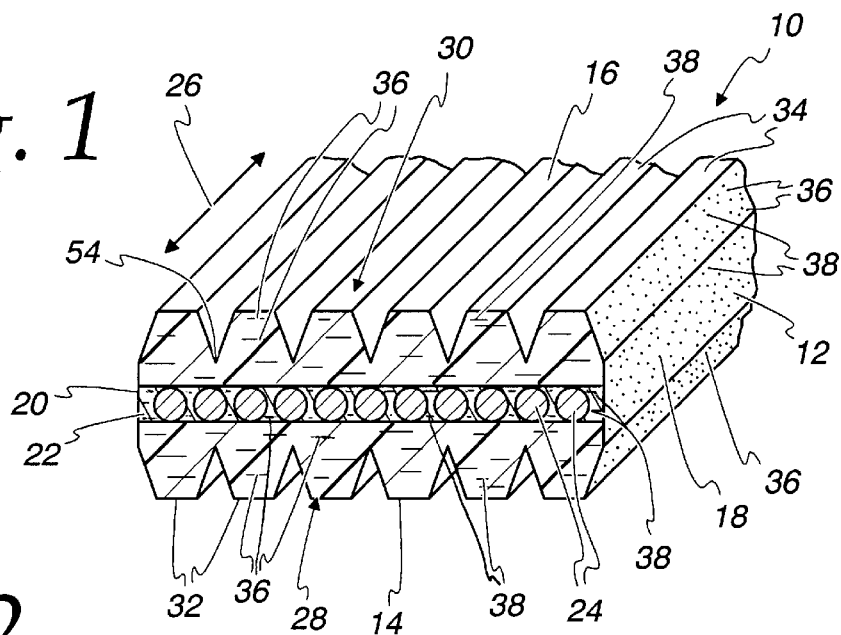
FIG. 1 is a cross-sectional, perspective view of a double V-ribbed belt made according to the present invention.

In FIG. 1, a double V-ribbed belt, according to the present invention, is shown at 10. The belt 10 has a body 12 with an inside 14, an outside 16, and laterally spaced sides 18, 20.

The body 12 consists of a bonding rubber layer 22, within which load carrying cords 24 are embedded. The load carrying cords 24 are laterally spaced and extend lengthwise, in the direction of the double-headed arrow 26, within the body 12. The load carrying cords 24 define the neutral axis for the belt 10.

An inner rubber layer 28 is formed on the inside of the bonding rubber layer 22, with an outer rubber layer 30 formed on the outside of the bonding rubber layer 22. The inner rubber layer 28 has V-shaped, laterally spaced ribs 32 formed therein and extending lengthwise of the belt body 12.

The outer rubber layer 30 has V-shaped ribs 34 formed therein and likewise extending lengthwise of the belt body 12.

The ribs 32, 34 are shown to have the same shape and pitch. However, the pitch for the ribs 32, 34 need not be the same. Further, the relative lateral position of the ribs 32, 34 may vary from that shown.

Depending upon the direction of bending, the ribs 32, 34 may be either at all times in compression or tension, or may alternate as they are reversely bent, between compression and tension loading.

The load carrying cords 24 are made to have high strength, with low elongation. The load carrying cords 24 may be made from various different fibers, such as polyester, aramid, and/or glass. The load carrying cords 24 are fully embedded in the bonding rubber layer 22.

The inner and outer rubber layers 28, 30 are elastomer layers. In a preferred form, the elastomer in the inner and outer layers 28, 30 is an ethylene-α-olefin elastomer that may be ethylene-propylene-diene monomer rubber (EPDM). The diene monomer may be at least one of dicyclopentadiene, methylene norbornene, ethylidene norbornene, 1,4-hexadiene, and cyclooctadiene. The elastomer may also be ethylene-propylene rubber (EPR).

For cross linking the above rubbers, organic peroxides are used that are preferably at least one of dicumyl peroxide, di-t-butyl peroxide, t-butylcumyl peroxide, benzoyl peroxide, 1,3-bis-(t-butyl-peroxyisopropyl) benzene, 2,5-dimethyl-2,5-di(t-butylperoxy)hexyne-3, 2,5-dimethyl-2,5-(benzoylperoxy)hexane, and 2,5-dimethyl-2,5-mono(t-butyl peroxy)hexane. The organic peroxide may be used alone or as a mixture in a range of 0.005 to 0.02 mol g per 100 g of the ethylene-α-olefin elastomer.

The degree of crosslinking can be increased to avoid adhesive wear by blending a crosslinking co-agent. The crosslinking co-agent may be selected from those typically used for peroxide crosslinking, including, but not limited to, at least one of TIAC, TAC, 1,2-polybutadiene, metal salts of unsaturated carboxylic acids, oxims, guanizine, trimethylol propane trimethacrylate, ethylene glycol dimethacrylate, N,N'-m-phenylene bismaleimide, and sulfur.

The rubber blends in the inner and outer layers 28, 30 may also include a) a reinforcing agent such as carbon black and/or silica, b) a filler such as calcium carbonate and/or talc, c) a plasticizer, d) a stabilizer, e) a processing aid, and/or f) a colorant.

Short reinforcing fibers 36 may be embedded in the inner and outer layers 28, 30. The fibers 36 extend laterally to improve lateral pressure resistance. Preferably, fibers 36 protrude at the sides 18, 20 to engage a cooperating pulley to thereby lower the coefficient of friction between the pulley and belt 10. This potentially reduces noise during belt running.

The short fibers 36 may be at least one of nylon 6, nylon 66, polyester, cotton, and aramid. Aramid fibers are preferred in view of their strength and good wear resistance.

The aramid fibers preferably have a length of from 1 to 20 mm and are present in an amount of 1 to 30 parts by weight per 100 parts by weight of the ethylene-α-olefin elastomer. The aramid fibers are preferably aramids having aromatic nuclei in the molecular structure. Examples of suitable aramid fibers are those sold commercially under the names CONEX™, NOMEX™, KEVLAR™, TECHNORA™, and TWARON™.

If the aramid fibers are present in an amount of less than 1 part by weight, the rubber in the inner and outer layers 28, 30 may tend to be sticky, which increases wear. If the fibers 36 are present in an amount greater than 30 parts by weight, uniform dispersion in the rubber layers 28, 30 may not occur. However, the short fibers 36 are not essential to the present invention. Short fibers made from other materials could also be used.

The inner and outer rubber layers 28, 30 may also contain minute short fiber-reinforced rubber in which an ethylene-α-olefin elastomer is graft-bonded with minute short fibers 38 having a diameter of no more than 1.0 μm. Preferably, the fiber length is in the range of 0.05 to 0.8 μm. The fibers 38 are present preferably in an mount of 1 to 50 parts by weight and, more preferably, 5 to 25 parts by weight, per 100 parts by weight of ethylene-α-olefin elastomer.

If the fibers 38 are present in an amount less than 1 part by weight, the wear resistance of the rubber may not be sufficient. On the other hand, if the amount of fibers 38 exceeds 50 parts by weight, elongation of the rubber composition may be diminished so as to lower heat resistance and flex resistance.

In the minute short, fiber-reinforced rubber, since the ethylene-α-olefin elastomer making up the rubber is identical or similar to the ethylene-α-olefin elastomer of the matrix rubber of the inner and outer layers 28, 30, the rubber bonds satisfactorily with the matrix rubber. Accordingly, since the ethylene-α-olefin elastomer and the minute short fibers 38 are chemically bonded, even between the minute short fiber-reinforced rubber and the matrix rubber or in the minute short fiber-reinforced rubber, cracks are less likely to be formed in the inner and outer layers 28, 30. Even when these cracks do form, they are less prone to propagating.

In the minute, short fiber-reinforced rubber, the boundary between the minute short fibers and the ethylene-α-olefin elastomer is grafted by way of an adhesive that is at least one of a) a silane coupling agent that is at least one of vinyl tris (β-methoxyethoxy) silane, vinyltriethoxy silane, and γ-methacryloxypropyl trimethoxy silane, b) a titanate coupling agent that is at least one of isopropyl triisostearoyl titanate and unsaturated carboxylic acid, that is at least one of acrylic acid, methacrylic acid, and maleic acid, and c) a novolac type phenol resin.

The rubber is prepared by kneading and extruding the ethylene-α-olefin elastomer and the minute short fibers 38, as well as an adhesive, such as the coupling agent above a temperature at which the fibers 38 are melted.

The minute, short fiber-reinforced rubber has a continuous phase consisting of the rubber ingredient in which the minute short fibers 38 are finely dispersed. The minute, short fibers 38 are bonded chemically with the rubber, or act with each other at the boundary thereof. This rubber composition is not prone to cracking. If cracking occurs, the cracks are not prone to propagating. A belt made using this composition may have excellent heat resistance, cold resistance, flexing resistance, and wear resistance.

The bonding rubber layer 22 is made from a rubber composition of the ethylene-α-olefin elastomer, described above, which can be sulfur-crosslinked. This may result in good heat resistance and good adhesion with polyester fibers, aromatic polyamide fibers, and/or glass fibers in the load carrying cords 24. In addition, the rubber composition may be blended with a) a reinforcing agent such as carbon black and/or silica, b) a filler such as calcium carbonate and/or talc, c) a plasticizer, d) a stabilizer, e) a processing aid, and/or f) a colorant.

If EPDM is used for the ethylene-α-olefin elastomer in the bonding rubber layer 22, it preferably has an iodine value of from 4 to 40. If the value is less than 4, crosslinking of the rubber composition by sulfur may not be sufficient to prevent popping out of the load carrying cords 24. On the other hand, if the iodine value exceeds 40, scorching of the rubber composition is shortened, making it difficult to handle. Also, heat resistance may be diminished.

Minute short fiber-reinforced rubber can be added to the bonding rubber layer 22.

The amount of sulfur in the bonding rubber layer 22 is preferably from 0.5 to 3.0 parts by weight per 100 parts by weight of the ethylene-α-olefin elastomer.

The load carrying cords 24 may be treated to enhance bonding with the rubber of the bonding rubber layer 22. The load carrying cords 24 may be immersed in a resorcin-formalin-latex solution (RFL) and thereafter heated to uniformly form a bonding layer on the surface thereof. The load carrying cords 24 may be pretreated with an epoxy and/or an isocyanate compound before treatment with the RFL solution.

The invention is not limited to a specific method of mixing each of the above components as they may be mixed by other means and methods well known to those skilled in the art. For example, the mixing may be carried out using a Banbury mixer or a kneader.

It is preferred that the portions of the inner and outer laters 28, 30 of the belt 10 exposed to a cooperating pulley have no reinforcing cloth or screen as might alter the power transmission characteristics of the belt 10. However, while the absence of a cloth or screen is preferred, the invention does contemplate that a cloth or screen can be used at the exposed, pulley engaging portions of one or both of the inner and outer layers 28, 30, to reduce the likelihood of crack formation and propagation and to prevent adhesion wear on the ribs 32, 34.

While not shown, optional grooves can be provided along the belt width to improve the flexing properties of the belt, in a manner known to those skilled in this art.

Figure 2:
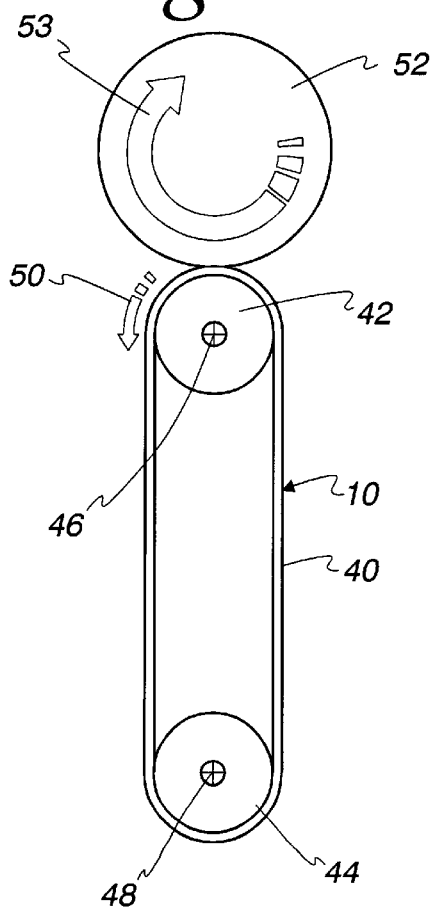
FIG. 2 is a front elevation view of a V-ribbed belt, according to the present invention, trained around spaced rollers, and with a rotary grinding wheel pressed against the belt as it is advanced to form ribs on one side of the power transmission belt.
Figure 3:
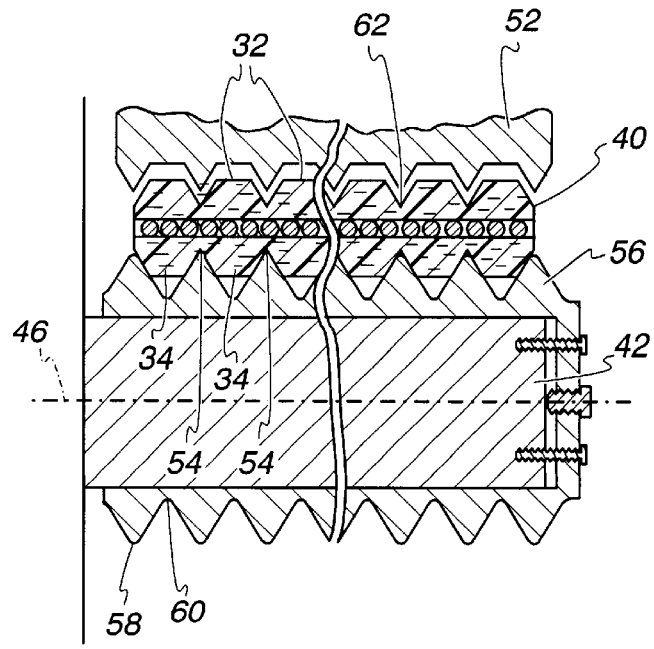
FIG. 3 is an enlarged, cross-sectional view showing the grinding wheel forming ribs on the other side of the power transmission belt after ribs have been formed on the one side of the power transmission belt as in FIG. 2.

The double V-ribbed belt 10 may be made according to the following process, as described in Japanese Patent No. 2762238. The rubber layer 28, having a composition which can be crosslinked with an organic peroxide using ethylene-α-olefin elastomer, is wound around the outer surface of a cylindrical molding drum. The bonding rubber layer 22 is then applied, and has a rubber composition which can be crosslinked with sulfur using ethylene-α-olefin. Load carrying cords 24 are then wrapped spirally around the bonding rubber layer 22. The rubber layer 30, which has a composition which can be crosslinked with an organic peroxide using ethylene-α-olefin elastomer, is then applied over the load carrying cords 24. The resulting laminate is crosslinked to produce a sleeve 40, as shown in FIGS. 2 and 3.

The sleeve 40 is trained around a driving roller 42 and a driven roller 44 which are rotatable around parallel axes 46, 48, respectively. The sleeve 40 is placed under a predetermined tension and driven around the rollers 42, 44 in the direction of the arrow 50. A grinding wheel 52, rotating in the direction of the arrow 53, is pressed against the exposed outer surface of the moving sleeve 40 to form the ribs 34 and grooves 54 between adjacent ribs 34.

The sleeve 40 is then separated from the rollers 42, 44 and turned inside out. A cartridge 56, having alternating protrusions 58 and recesses 60, that are complementary to the rib teeth 34 and grooves 54, is placed over the roller 42. The belt sleeve 40, turned inside out, is trained around the roller 44 and cartridge 56 so that the ribs 34 nest in the grooves 60. The sleeve 40 is placed under a predetermined tension. As seen in FIG. 3, the grinding wheel 52 is pressed against the sleeve 40 to form the ribs 32, with grooves 62 therebetween. The sleeve 40 is advanced in the direction of the arrow 50 and the grinding wheel 52 is rotated in the direction of the arrow 53 as this formation step is carried out. Conventionally, from 3 to 100 grooves 54, 62 are simultaneously formed by the grinding wheel 52.

The resulting sleeve 40 is then removed from the roller 44 and cartridge 56 and trained around driving and driven rollers (not shown) on a separate assembly and conventionally cut to width by a cutter (not shown) to produce individual double V-ribbed belts 10.

Below, the performance of a number of specific belts, having the inventive construction and a conventional construction, is compared.

The inventive belt sleeve was prepared by using a tension rubber layer having a 3 mm thickness, a bonding rubber layer having a 0.5 mm thickness, and a compression rubber layer having a 3 mm thickness. The layers were formed by calendar rolls from the rubber composition shown in Table 1, below.

TABLE 1

| | (parts by weight) | | | | | |
|---|---|---|---|---|---|---|
| | Upper/Lower Ribs | | | Bonding Rubber Layer | | |
| Compound | R1 | R2 | R3 | C1 | C2 | C3 |
| EPDM Mitsui 4045 | 100 | 100 | 100 | 100 | 100 | 100 |
| Nylon cut yarn | 10 | 10 | 10 | — | — | — |
| Aramid cut yarn | 10 | 10 | 10 | — | — | — |
| Stearic acid | 1.5 | 1.5 | 1.5 | 0.5 | 0.5 | 0.5 |
| Zinc oxide | 5 | 5 | 5 | 5 | 5 | 5 |
| HAF carbon black | 55 | 55 | 55 | 40 | 40 | 40 |
| Paraffin oil | 15 | 15 | 15 | 15 | 15 | 15 |
| Hydrous silica | — | — | — | 15 | 15 | 15 |
| Vulcanization accelerator (1) | — | — | 1 | — | 1 | — |
| Vulcanization accelerator (2) | — | — | 0.5 | — | 0.5 | 0.6 |
| Vulcanization accelerator (3) | — | — | 1 | — | 1 | — |
| Vulcanization accelerator (4) | — | — | — | — | — | 0.5 |
| Vulcanization accelerator (5) | — | — | — | — | — | 2 |
| Sulfur | — | — | 1 | — | 1 | 0.8 |
| Peroxide (6) | 8 | — | — | 8 | — | — |
| Peroxide (7) | — | 2 | — | — | — | — |
| Crosslinking co-agent (8) | 2 | 2 | — | 2 | — | — |

(1) Tetramethyl thiuram disulfide (TDM)
(2) Dipentamethylenethiuram tetrasulfide (DPTT)
(3) N-cyclkohexyl-2-benzothiazyl-sulfenamide (CBS)
(4) Tetramethylthiuram monosulfide
(5) Tellurium diethyldithiocarbamate
(6) Dicumyl peroxide (40%)
(7) 1,3-bis-(t-butyl peroxy isopropyl) benzene (>98%)
(8) N,N'-m-phenylenedimaleimide The rubber composition was kneaded in a Banbury mixer. Load carrying cords were made from polyesterfiber. Laterally extending, short, reinforcing fibers were embedded in the compression and tension rubber layers.

A sleeve was trained around driving and driven rollers and run at a predetermined tension. The travelling belt was ground by a rotating grinding wheel to form ribs, and grooves between adjacent ribs. The grinding wheel was rotated at 1800 rpm in a direction opposite to the direction of rotation of the sleeve.

After forming the ribs and grooves on one side, the sleeve was reversed. A cylindrical cartridge, with complementary ribs and grooves, was placed over the driving roller. The reversed sleeve was then interlocked with the cylindrical cartridge and tensioned. The sleeve was then driven and ground by the rotating wheel and polished to obtain the second set of ribs and grooves.

The thus formed sleeve was detached from the driving and driven rollers, trained around separate cutting rollers, and cut into individual double V-ribbed belts, each having three ribs.

The resulting V-ribbed belt was a K-type, three ribbed belt with a length of 975 mm according to RMA standards. The upper/lower rib pitch was 3.56 mm. The rib height was 2.0 mm. The belt thickness was 6.3 mm. The angle for the upper and lower ribs was 40°.

The resulting belts were subjected to a) a peeling test between the load carrying cords and bonding rubber layer, b) a heat resistance running test, and c) evaluation for the absence or presence of adhesive wear in a running test at room temperature. The results are shown in Tables 2 and 3, below.

TABLE 2

|  | Inventive Example 1 | | Inventive Example 2 | | Inventive Example 3 | | Comparative Example 1 | | Comparative Example 2 | |
| --- | --- | --- | --- | --- | --- | --- | --- | --- | --- | --- |
| Bonding rubber layer | C2 sulfur | | C3 sulfur | | C2 sulfur | | C1 peroxide | | C2 sulfur | |
| Compression rubber layer | R1 peroxide | | R1 peroxide | | R2 peroxide | | R1 peroxide | | R3 sulfur | |
| Atmospheric temperature (° C.) | 23 | 120 | 23 | 120 | 23 | 120 | 23 | 120 | 23 | 120 |
| Adhesion (N) (peeling strength between two load carrying members) | 46.5 | 13.9 | 44.8 | 12.4 | 45.5 | 12.5 | 24.8 | 4.2 | 52.2 | 15.5 |

TABLE 3

|  | Inventive Example 1 | Inventive Example 2 | Inventive Example 3 | Comparative Example 1 | Comparative Example 2 |
| --- | --- | --- | --- | --- | --- |
| Bonding rubber layer | C2 sulfur | C3 sulfur | C2 sulfur | C1 peroxide | C2 sulfur |
| Upper/lower ribs | R1 peroxide | R1 peroxide | R1 peroxide | R1 peroxide | R3 sulfur |
| Pop-out after 100 hrs running | none | none | none | 50 mm popout after 24 hrs | none |
| Adhesive wear | none | none | none | none | observed |

In the peeling test, two load carrying cords were peeled at a rate of 50 mm/min at an atmospheric temperature of 23° C. and 120° C. using a strograph T.

For the running test, a system was used having a driving pulley with a 120 mm diameter, a driven pulley with a 120 mm diameter, an idler pulley with a 70 mm diameter, and a tension pulley with a 45 mm diameter. The belt was trained around the pulleys of the testing system and run at an atmospheric temperature of 120° C. The driving pulley was operated at 4900 rpm, with a load of 12 HP on the driven pulley and with an initial applied tension of 57 kgf on the tension pulley. The idler pulley was engaged at the back of the belt, with the winding angle being 90°.

The time until crack formation occurred was measured. The heat resistance performance was compared using the running test.

In evaluating the absence or presence of adhesive wear during the running test at room temperature, a testing system was used having a driving pulley with a 120 mm diameter, a driven pulley with a 120 mm diameter and a tension pulley with a 45 mm diameter. The belt was trained therearound and driven, with the driving pulley rotated at 4900 rpm. An initial tension of 85 kgf was applied to the tension pulley.

As can be seen from the results in Tables 2 and 3, the inventive belt, having a rubber composition with ethylene-propylene rubber capable of organic peroxide crosslinking for the inner and outer layers, and a rubber composition of ethylene-propylene rubber capable of sulfur crosslinking for the bonding rubber layer, had a) better adhesion between the load carrying cords and the bonding rubber layer, b) improved belt life at high temperatures, and c) less adhesive wear, with respect to the comparative belt examples.

The foregoing disclosure of specific embodiments is intended to be illustrative of the broad concepts comprehended by the invention.

What is claimed is:

1. A power transmission belt comprising:
a body having a length, an inside, an outside, and laterally spaced sides, the body comprising a bonding rubber layer in which elongate load carrying cords are embedded to extend lengthwise of the body,
the body further comprising a first layer on the inside of the bonding rubber layer in which a plurality of laterally spaced ribs are formed extending lengthwise of the body,
the body further comprising a second layer on the outside of the bonding rubber layer in which a plurality of laterally spaced ribs are formed extending lengthwise of the body,
wherein the bonding rubber layer comprises a sulfur-crosslinked rubber composition comprising an ethylene-α-olefin elastomer,
wherein at least one of the first and second layers comprises a crosslinking product comprising an organic peroxide-crosslinked rubber composition comprising an ethylene-α-olefin elastomer.

2. The power transmission belt according to claim 1 wherein the first and second layers both comprise a crosslinking product comprising an organic peroxide-crosslinked rubber composition comprising an ethylene-α-olefin elastomer.

3. The power transmission belt according to claim 2 wherein there is no reinforcing cloth on any of the inside, outside, or laterally spaced sides of the body.

4. The power transmission belt according to claim 2 wherein the ethylene-α-olefin elastomer in the first and second layers comprises at least one of ethylene-propylene-diene monomer (EPDM) and ethylene-propylene rubber (EPR).

5. The power transmission belt according to claim 4 wherein the ethylene-α-olefin elastomer comprises ethylene-propylene-diene monomer wherein the diene monomer comprises at least one of dicyclopentadiene, methylene norbornene, ethylidene norbornene, 1,4-hexadiene, and cyclooctadiene.

6. The power transmission belt according to claim 2 wherein the organic peroxide comprises at least one of dicumyl peroxide, di-t-butyl peroxide, t-butylcumyl peroxide, benzoyl peroxide, 1,3-bis-(t-butyl-peroxyisopropyl)benzene, 2,5-dimethyl-2,5-di(t-butylperoxy)hexyne-3, 2,5-dimethyl-2,5-(benzoylperoxy)hexane and 2,5-dimethyl-2,5-mono(t-butyl peroxy)hexane.

7. The power transmission belt according to claim 6 wherein the organic peroxide is used either a) alone, or b) as a mixture within a range of 0.005 to 0.02 mol g per 100 g of ethylene-α-olefin elastomer.

8. The power transmission belt according to claim 2 further comprising a crosslinking co-agent comprising at least one of TIAC, TAC, 1,2-polybutadiene, metal salts of unsaturated carboxylic acids, oxims, guanizine, trimethylol propane trimethacrylate, ethylene glycol dimethacrylate, N,N'-m-phenylene bismaleimide, and sulfur.

9. The power transmission belt according to claim 2 further comprising at least one of a) a reinforcing agent comprising at least one of carbon black and silica, b) a filler comprising at least one of calcium carbonate and talc, c) a plasticizer, d) a stabilizer, e) a processing aid, and f) a colorant.

10. The power transmission belt according to claim 2 further comprising a plurality of short reinforcing fibers in at least one of the first and second layers.

11. The power transmission belt according to claim 10 wherein short reinforcing fibers in the plurality of short reinforcing fibers protrude at the laterally spaced sides of the body.

12. The power transmission belt according to claim 10 wherein the short reinforcing fibers comprise at least one of nylon 6, nylon 66, polyester, cotton, aramid fibers, aramid fibers having aromatic nuclei in the molecular structure, and aramid fibers sold commercially under any of the trademarks CONEX™, NOMEX™, KEVLAR™, TECHNORA™, and TWARON™.

13. The power transmission belt according to claim 12 wherein the short reinforcing fibers have a length of 1–20 mm.

14. The power transmission belt according to claim 13 wherein the short reinforcing fibers are present in an amount of 1–30 parts by weight per 100 parts by weight of ethylene-α-olefin elastomer.

15. The power transmission belt according to claim 2 wherein at least one of the first and second layers comprises fiber-reinforced rubber in which an ethylene-α-olefin elastomer is graft-bonded with short fibers having a diameter no more than 1.0 μm and present in an amount of 1–50 parts by weight per 100 parts by weight of ethylene-α-olefin elastomer.

16. The power transmission belt according to claim 15 wherein the short fibers have a diameter from 0.05 to 0.8 μm and are present in an amount of 5–25 parts by weight per 100 parts by weight of ethylene-α-olefin elastomer.

17. The power transmission belt according to claim 15 wherein a boundary between the short fibers and ethylene-α-olefin elastomer is grafted using an adhesive comprising at least one of a) a silane coupling agent comprising at least one of vinyl tris (β-methoxyethoxy) silane, vinyltriethoxy silane, and γ-methacryloxypropyl trimethoxy silane, b) a titanate coupling agent comprising at least one of isopropyl triisostearoyl titanate and unsaturated carboxylic acid comprising at least one of acrylic acid, methacrylic acid, and maleic acid, and c) a novolac type phenol resin.

18. The power transmission belt according to claim 1 wherein the ethylene-α-olefin elastomer in the bonding rubber layer comprises EPDM with an iodine value from 4–40.

19. The power transmission belt according to claim 1 wherein the bonding rubber layer further comprises at least one of a) a reinforcing agent comprising at least one of carbon black and silica, b) a filler comprising at least one of calcium carbonate and talc, c) a plasticizer, d) a stabilizer, e) a processing aid, and f) a colorant.

20. The power transmission belt according to claim 1 wherein the bonding rubber layer further comprises a plurality of short fibers embedded therein.

21. The power transmission belt according to claim 1 wherein the sulfur in the bonding rubber layer is present in an amount of 0.5 to 3.0 parts by weight per 100 parts by weight of ethylene-α-olefin elastomer.

22. The power transmission belt according to claim 1 wherein the load carrying cords comprise fibers that are treated by applying a resorcin-formalin-latex (RFL) solution.

23. The power transmission belt according to claim 22 wherein the fibers of the load carrying cords are pretreated with at least one of an epoxy and isocyanate compound before treating with RFL.

* * * * *